(12) United States Patent
Yang et al.

(10) Patent No.: US 8,622,552 B2
(45) Date of Patent: Jan. 7, 2014

(54) PORTABLE COMPUTING DEVICE WITH MEDIA PLAYER AND PROJECTING UNIT

(75) Inventors: Chin-Sung Yang, Taipei Hsien (TW); He-Li Wang, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

(*) Notice: Subject to any disclaimer, the term of this patent is extended or adjusted under 35 U.S.C. 154(b) by 775 days.

(21) Appl. No.: 12/790,966

(22) Filed: May 31, 2010

(65) Prior Publication Data

US 2011/0234924 A1    Sep. 29, 2011

(30) Foreign Application Priority Data

Mar. 25, 2010    (CN) .......................... 2010 2 0141898

(51) Int. Cl.
| | |
|---|---|
| G03B 21/00 | (2006.01) |
| G03B 21/14 | (2006.01) |
| G03B 21/22 | (2006.01) |
| G02B 21/36 | (2006.01) |
| H04N 5/64 | (2006.01) |
| H04N 9/31 | (2006.01) |
| A47B 81/00 | (2006.01) |

(52) U.S. Cl.
USPC .............. 353/119; 353/39; 353/71; 348/744; 345/905; 312/10.1

(58) Field of Classification Search
USPC .............. 353/30–31, 39, 71, 74, 78–79, 119, 353/122, 72; 312/10.1, 223.2; 345/901, 345/905; 348/552, 744, 789, 794; 361/679.02, 679.09, 679.21, 679.23, 361/679.26–679.27, 679.55
See application file for complete search history.

(56) References Cited

U.S. PATENT DOCUMENTS

| | | | | |
|---|---|---|---|---|
| 5,483,250 | A * | 1/1996 | Herrick ........................... | 345/32 |
| 5,680,233 | A * | 10/1997 | Faris et al. ...................... | 349/61 |
| 5,826,962 | A * | 10/1998 | Rodriguez, Jr. ................. | 353/82 |
| 6,208,506 | B1 * | 3/2001 | Pao .......................... | 361/679.33 |
| 6,525,750 | B1 * | 2/2003 | Knox .............................. | 345/30 |
| 6,806,850 | B2 * | 10/2004 | Chen .................................. | 345/7 |
| 6,873,356 | B1 * | 3/2005 | Kanbe et al. ............... | 348/207.1 |
| 7,110,052 | B1 * | 9/2006 | Faris et al. .......................... | 349/5 |
| 7,239,305 | B1 * | 7/2007 | Nakano et al. ................ | 345/179 |
| 7,641,348 | B2 * | 1/2010 | Yin et al. ...................... | 353/119 |
| 7,869,204 | B2 * | 1/2011 | Bair et al. .................. | 361/679.3 |
| 7,911,783 | B2 * | 3/2011 | Hsieh et al. .............. | 361/679.55 |
| 8,264,599 | B2 * | 9/2012 | Liu .............................. | 348/374 |
| 8,284,331 | B2 * | 10/2012 | Chien .............................. | 349/5 |
| 2001/0046034 | A1 * | 11/2001 | Gold et al. ...................... | 353/72 |
| 2002/0063855 | A1 * | 5/2002 | Williams ...................... | 353/122 |
| 2003/0117343 | A1 * | 6/2003 | Kling ............................. | 345/32 |
| 2007/0013873 | A9 * | 1/2007 | Jacobson et al. ................ | 353/30 |
| 2007/0211167 | A1 * | 9/2007 | Adams et al. ................. | 348/452 |

(Continued)

*Primary Examiner* — Tony Ko
*Assistant Examiner* — Jori S Reilly-Diakun
(74) *Attorney, Agent, or Firm* — Altis Law Group, Inc.

(57) ABSTRACT

A media player includes a display and a main body. The display includes a cover and a display panel located on the cover. The host includes a housing, a control module received in the housing, with a projecting unit also received in the housing. The housing is rotatably connected to the cover and operable to be covered by the cover. The control module is for generating video signals to display in the display panel. The projecting unit is for converting the video signals into optical signals and projecting the optical signals out of the housing.

11 Claims, 3 Drawing Sheets

(56) References Cited

U.S. PATENT DOCUMENTS

2007/0257181 A1* 11/2007 Dittmer et al. ............... 248/637
2009/0033882 A1* 2/2009 Solomon ....................... 353/85
2009/0207386 A1* 8/2009 Liu et al. ...................... 353/119
2009/0213279 A1* 8/2009 Ichieda ......................... 348/734
2011/0043766 A1* 2/2011 Itoh et al. ....................... 353/37
2012/0038893 A1* 2/2012 Hsieh et al. .................. 353/101

* cited by examiner

PORTABLE COMPUTING DEVICE WITH MEDIA PLAYER AND PROJECTING UNIT

BACKGROUND

1. Technical Field

The present disclosure relates to media players, and particularly to a media player with a projecting unit.

2. Description of Related Art

A media player is often used for reproducing electronic data recorded on various storage media. The media player usually comprises a host for processing the electronic data and a display having a display screen for displaying the processed electronic data. However, the display screen may be too small for group viewing.

Therefore, there is room for improvement in the art.

BRIEF DESCRIPTION OF THE DRAWINGS

The components of the drawings are not necessarily drawn to scale, the emphasis instead being placed upon clearly illustrating the principles of the embodiment of a media player having a projecting unit. Moreover, in the drawings, like reference numerals designate corresponding parts throughout several views.

DETAILED DESCRIPTION

Embodiments of the present disclosure will now be described in detail with reference to the drawings.

Figure 1:
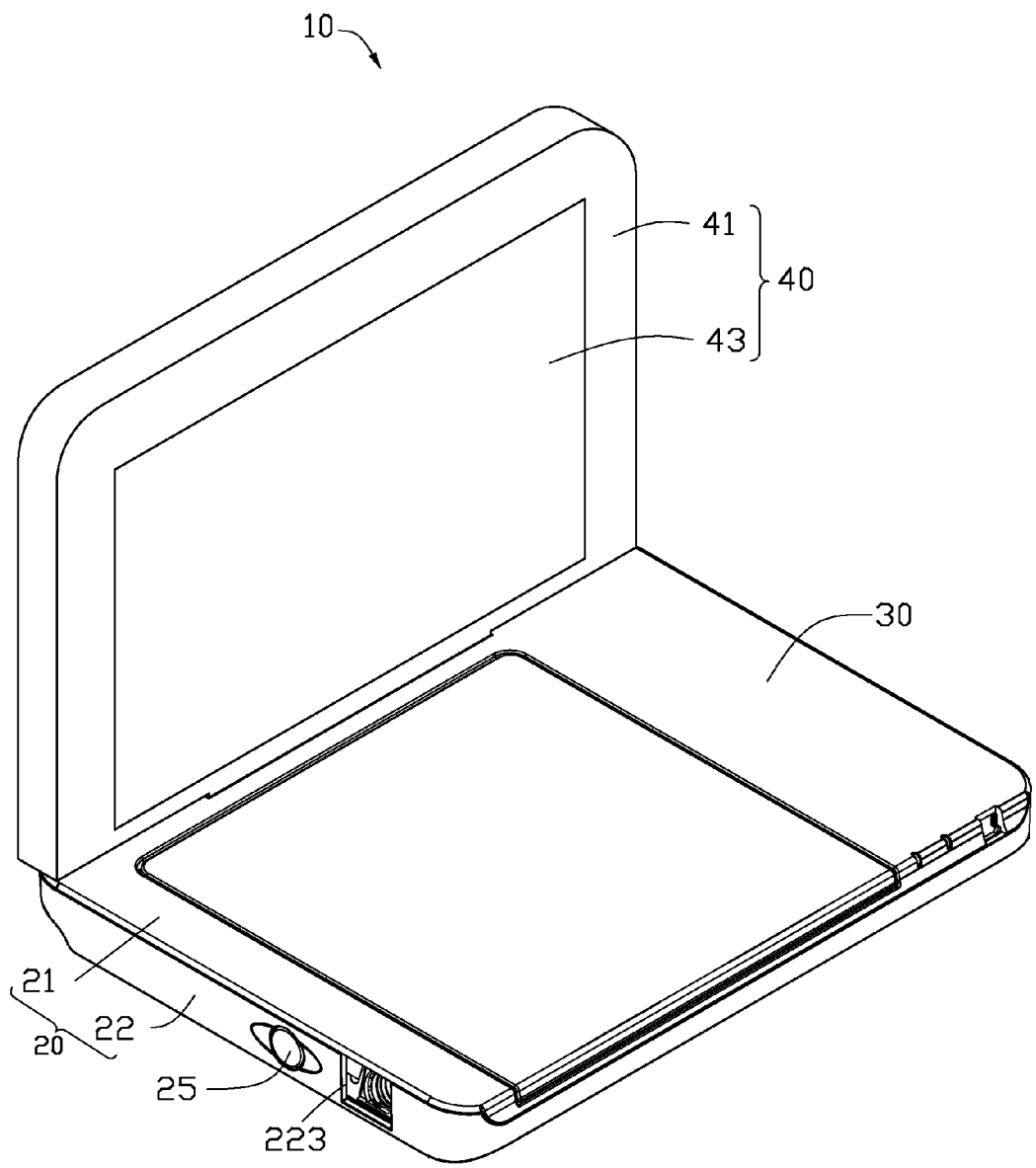
FIG. 1 is an isometric, schematic view of a media player having a main body, according to an exemplary embodiment.

Referring to FIG. 1, a media player 10 according to an exemplary embodiment is illustrated. In this embodiment, the media player 10 is a portable digital video disc (DVD). In other embodiments, the media player 10 may be a notebook computer, or a mobile phone, or the other electronic devices with a display panel. The media player 10 includes a host 30 and a display 40.

The display 40 includes a cover 41 and a display panel 43. The cover 41 is rotatably connected to the host 30 to switch between covering the host 30 and rotating away from the host 30 for viewing of the display panel 43. The display panel 43 is located on the cover 41 and faces the host 30 when the cover 41 covers the host 30.

Figure 2:
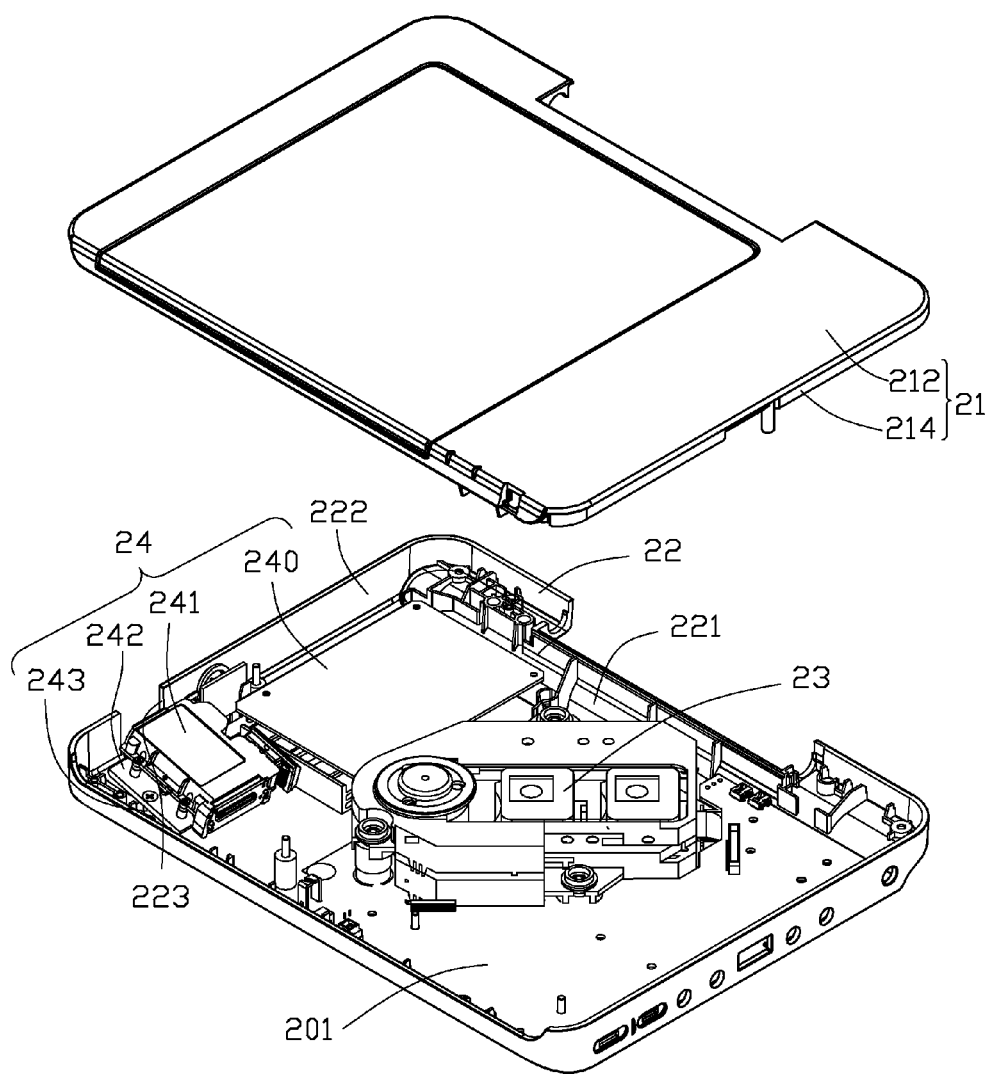
FIG. 2 is an exploded view of the host of the media player of FIG. 1.

Further referring to FIG. 2, the host 30 includes a housing 20, a control module 23, and a projecting unit 24.

The housing 20 includes a first casing 21 and a second casing 22 corresponding with the first casing 21. The first casing 21 clamps the second casing 22 to together define a receiving room 201. The receiving room 201 is for receiving the control module 23 and the projecting unit 24.

The first casing 21 includes a substantially rectangular top plate 212 and a first wall 214. The top plate 212 faces the display panel 43 when the display 40 covers the host 30. The first wall 214 substantially perpendicularly extends from sides of the top plate 212.

The second casing 22 includes a substantially rectangular bottom plate 221 corresponding with the top plate 212, and a second wall 222 corresponding with the first wall 214. The bottom plate 221 is opposite to the display panel 43. The second wall 222 substantially perpendicularly extends from sides of the bottom plate 221. The two walls 214 and 222 clamp together to connect the top plate 212 and the bottom plate 221. The second wall 222 defines an opening 223.

The control module 23 is used for reading video signals from an optical medium (not shown), and transmitting the video signals to either the display panel 43 or the projecting unit 24 for viewing. In this embodiment, the control module 23 is an optical pickup head (OPU) module.

The projecting unit 24 is used for receiving the video signals from the control module 23, and converting the video signals to optical signals so as to project the optical signals out of the housing 20 via the opening 223 of the second wall 222. The projecting unit 24 is operated by a switch unit 25. In this embodiment, the switch unit 25 is a key set on the second casing 22 of the housing 20. In other embodiments, the switch unit 25 can be set on other positions of the media player 10, or be set as a short cut in a menu of the media player 10.

The projecting unit 24 includes a main board 240, a lens module 241, a supporting member 242, and a fixing assembly 243.

Figure 3:
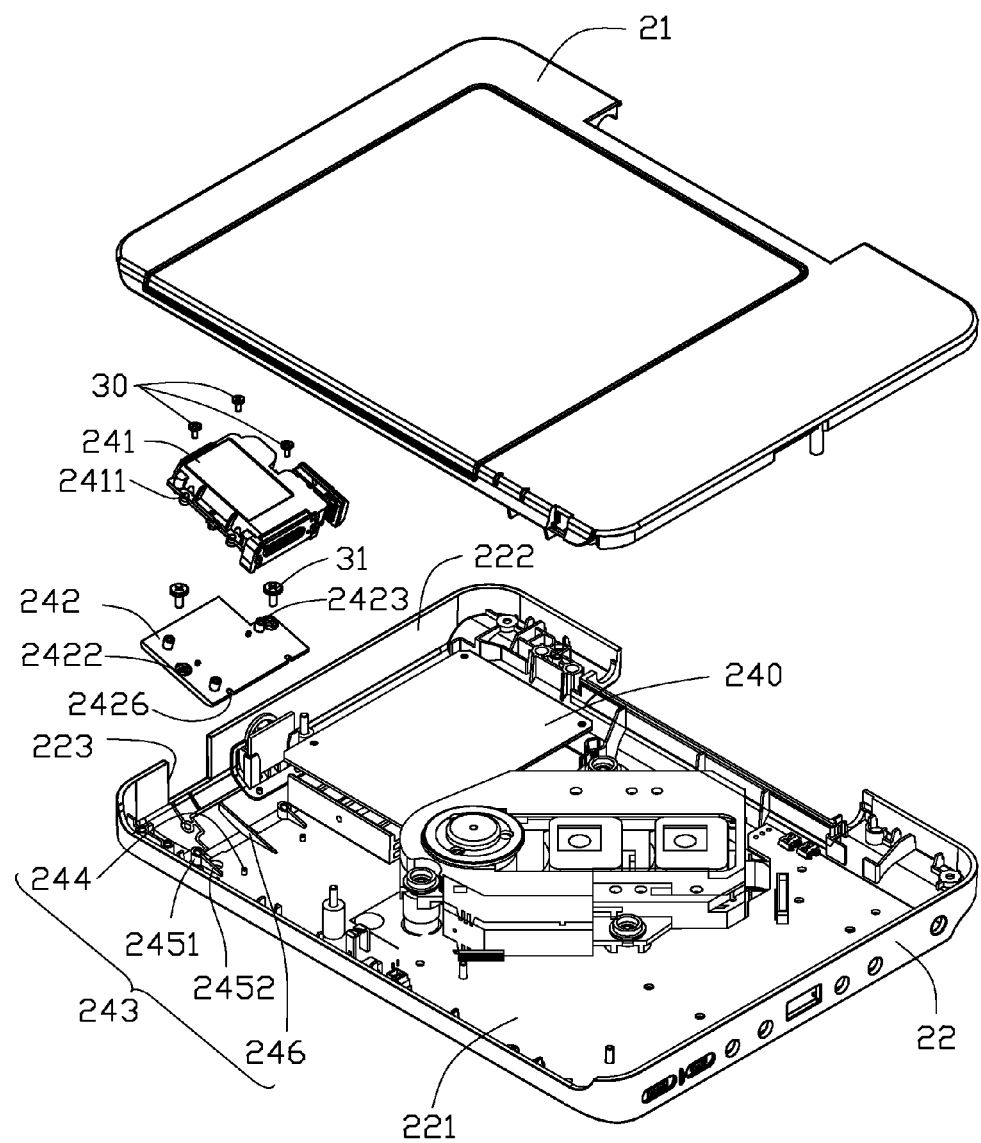
FIG. 3 is a detailed, exploded view of the host of FIG. 2.

Further referring to FIG. 3, the main board 240 is received in the receiving room 201 and near the opening 223 of the second wall 222. The main board 240 is used for receiving the video signals from the control module 23, converting the video signals to the optical signals, and projecting the optical signals via the lens module 241. The lens module 241 defines a plurality of first fastening holes 2411.

The supporting member 242 is used for supporting the lens module 241. In this embodiment, the supporting member 242 includes a plurality of first fastening posts 2423 corresponding with the plurality of first holes 2411. A plurality of second holes 2422 is defined through the supporting member 242. A plurality of slots 2426 is defined on a peripheral of the supporting member 242. A plurality of first bolts 30 is through the plurality of corresponding first holes 2411 to be engaged with the plurality of corresponding first fastening posts 2423, thus, the lens module 241 is fixed on the supporting member 242.

The fixing assembly 243 includes a plurality of clip member 244 corresponding with the plurality of slots 2426, a plurality of second fastening posts 2451 corresponding with the plurality of second holes 2422, a holding member 246, and a plurality of substantially triangle portions 2452.

One end surface of each second fastening post 2451 is fixed on the bottom plate 221, the other end surface of each second fastening post 2451 is inclined. The higher end of the inclined end surface of the second fastening post 2451 faces the opening 223 of the second wall 222. The plurality of substantially triangle portions 2452 is set on the plurality of corresponding second fastening posts 2451. The inclined end surface of the second fastening post 2451 is substantially flatly jointed to the corresponding triangle portion 2452, thus, the inclined end surface of the second fastening post 2451 has a same angle of inclination of the corresponding triangle portion 2452.

The holding member 246 is set and is inclined to the bottom plate 221 to have the same angle as the plurality of triangle portions 2452. The holding member 246, the plurality of triangle portions 2452, and the plurality of second fastening posts 2451 cooperatively define an inclined plane to support the supporting member 242. A plurality of second bolts 31 is through the plurality of corresponding second holes 2422 to be engaged with the plurality of corresponding second fastening posts 2451, thus, the supporting member 242 is fixed on the bottom plate 221. The plurality of clip members 244 is clamped in the plurality of corresponding slots 2426 to secure the supporting member 242 on the inclined plane.

As the supporting member 242 is supported by the inclined plane, which is defined by the holding member 246, the plurality of substantially triangle portions 2452, and the plurality of second fastening posts 2451 cooperatively. The lens module 241 is inclined with the bottom plate 221 to get a good projecting angle, and it is easy to facilitate heat dissipation from the lens module 241.

As discussed, the media player 10 can either project the video signals with the projecting unit 24, or display the video signals with the display panel 43 of the display 40. When the media player 10 uses the projecting unit 24 to project, other people may view the projection on a larger external screen.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A media player, comprising:
    a display comprising:
       a cover; and
       a display panel located on the cover; and
    a host comprising:
       a housing rotatably connected to the cover and operable to be covered by the cover, the housing having a bottom plate;
       a control module received in the housing, the control module for generating video signals to display in the display panel;
       a projecting unit received in the housing, the projecting unit for converting the video signals into optical signals and projecting the optical signals out of the housing; and
       a fixing assembly received in the housing for defining an inclined plane relative to the bottom plate to support the projecting unit, so as to get a projecting angle and to facilitate heat dissipation from the projecting unit;
    wherein the housing comprises a first casing facing the display panel, and a second casing reversely facing the display panel, the first casing corresponds with the first casing and clamps the second casing to together define a receiving room, the receiving room is for receiving the control module and the projecting unit, the opening is defined on a wall of the second casing;
    an opening is defined on the housing, the projecting unit projects the optical signals out of the housing via the opening;
    the projecting unit comprises:
       a lens module adjacent to the opening for projecting the optical signals out of the housing through the opening;
       a supporting member for supporting and fixing the lens module; and
       a main board for converting the video signals into the optical signals, and transmitting the optical signals to the lens module;
    the fixing assembly fixes the supporting member on the bottom plate of the second casing;
    a plurality of holes is defined through the supporting member, the fixing assembly comprises a plurality of fastening posts corresponding with the plurality of holes, the plurality of fastening posts is fixed on the bottom plate, a plurality of bolts is through the plurality of corresponding holes to be engaged with the plurality of corresponding fastening posts so as that the supporting member is fixed on the bottom plate; and
    one end surface of each fastening post is fixed on the bottom plate, the other end surface of each fastening post is inclined, the higher end of the inclined end surface of the fastening post faces the opening, a plurality of triangle portions is set on the plurality of corresponding fastening posts, the inclined end surface of the fastening post is flatly jointed to the corresponding triangle portion so as that the inclined end surface of the fastening post has a same angle of inclination of the corresponding triangle portion, the supporting member is supported by the inclined plane defined by the plurality of inclined end surface of the fastening post and the plurality of triangle portions.

2. The media player of claim 1, wherein the media player is a digital video disc, the control module is an optical pickup head module.

3. The media player of claim 1, wherein the lens module defines a plurality of holes, the supporting member comprises a plurality of fastening posts corresponding with the plurality of holes, a plurality of bolts is through the plurality of corresponding holes to be engaged with the plurality of corresponding fastening posts so as that the lens module is fixed on the supporting member.

4. The media player of claim 1, wherein the fixing assembly further comprises a holding member, the holding member is set and inclined to the bottom plate to have the same angle of the plurality of triangle portions, the inclined plane is further defined by the holding member.

5. The media player of claim 1, wherein a plurality of slots is further defined on a peripheral of the supporting member, the fixing assembly further comprises a plurality of clip members corresponding with the plurality of slots, one end of each clip member is fixed on the bottom plate, the other end of the clip member is clamped in the corresponding slot so as that the supporting member is stably positioned on the inclined plane.

6. The media player of claim 1, wherein the projecting unit is operated by a switch unit.

7. A media player, comprising:
    a display comprising:
       a cover; and
       a display panel located on the cover; and
    a host comprising:
       a housing rotatably connected to the cover and operable to be covered by the cover;
       a control module received in the housing, the control module for generating video signals to display in the display panel; and
       a projecting unit received in the housing, the projecting unit inclined to the housing to get a projecting angle and to facilitate heat dissipation from the projecting unit, the projecting unit for converting the video signals into optical signals and projecting the optical signals out of the housing with the projecting angle;
    wherein the housing comprises a first casing facing the display panel, and a second casing reversely facing the display panel, the first casing corresponds with the first casing and clamps the second casing to together define a receiving room, the receiving room is for receiving the control module and the projecting unit, an opening is defined on a wall of the second casing; and
    the fixing assembly comprises a plurality of fastening posts, one end surface of each fastening post is fixed on a bottom plate of the second casing, the other end surface of each fastening post is inclined and supports the projecting unit, the higher end of the inclined end surface of the fastening post be adjacent to the opening.

8. The media player of claim 7, wherein the projecting unit comprises:
- a lens module adjacent to the opening for projecting the optical signals out of the housing through the opening;
- a supporting member for supporting and fixing the lens module; and
- a main board for converting the video signals into the optical signals, and transmitting the optical signals to the lens module.

9. The media player of claim 8, wherein the projecting unit further comprises a fixing assembly for fixing the supporting member on a bottom plate of the second casing.

10. The media player of claim 9, wherein the fixing assembly is inclined to the bottom plate so as that the lens module is inclined with the bottom plate to get the projecting angle and to facilitate heat dissipation from the lens module.

11. The media player of claim 7, wherein the fixing assembly comprises a plurality of triangle portions set on the plurality of corresponding fastening posts, the inclined end surface of the fastening post is connected with the corresponding triangle portion, and the inclined end surface of the fastening post has a same angle of inclination of the corresponding triangle portion, the projecting unit is supported by an inclined plane defined by the plurality of inclined end surface of the fastening post and the plurality of triangle portions.

* * * * *